US009547083B2

(12) United States Patent
Bandyopadhyay et al.

(10) Patent No.: US 9,547,083 B2
(45) Date of Patent: Jan. 17, 2017

(54) DETERMINING WHETHER A TARGET OBJECT WAS PRESENT DURING A SCANNING OPERATION

(71) Applicant: QUALCOMM Incorporated, San Diego, CA (US)

(72) Inventors: Saurav Bandyopadhyay, Milpitas, CA (US); Eliza Yingzi Du, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/850,853

(22) Filed: Sep. 10, 2015

(65) Prior Publication Data

US 2016/0077205 A1    Mar. 17, 2016

Related U.S. Application Data

(60) Provisional application No. 62/050,025, filed on Sep. 12, 2014.

(51) Int. Cl.

| | | |
|---|---|---|
| *G01S 15/00* | (2006.01) | |
| *G01S 15/04* | (2006.01) | |
| *G06K 9/36* | (2006.01) | |
| *G01S 7/527* | (2006.01) | |
| *G06K 9/00* | (2006.01) | |
| *G06K 9/32* | (2006.01) | |
| *G06K 9/52* | (2006.01) | |

(52) U.S. Cl.
CPC .............. *G01S 15/04* (2013.01); *G01S 7/5276* (2013.01); *G06K 9/00067* (2013.01); *G06K 9/3233* (2013.01); *G06K 9/36* (2013.01); *G06K 9/522* (2013.01)

(58) Field of Classification Search
CPC ... G01S 15/04; G06K 9/6217; G06K 9/00067; G06K 9/00221; G06K 9/36
USPC .............................................. 367/93; 382/124
See application file for complete search history.

(56) References Cited

U.S. PATENT DOCUMENTS

| | | | |
|---|---|---|---|
| 4,225,850 A | 9/1980 | Chang et al. | |
| 4,615,027 A * | 9/1986 | Rajkai | G06F 17/142 |
| | | | 708/404 |
| 6,400,996 B1 * | 6/2002 | Hoffberg | G01B 13/00 |
| | | | 700/114 |
| 8,391,568 B2 * | 3/2013 | Satyan | G06K 9/00026 |
| | | | 382/124 |

(Continued)

FOREIGN PATENT DOCUMENTS

| | | |
|---|---|---|
| EP | 1724725 A1 | 11/2006 |
| WO | 0124700 A1 | 4/2001 |

OTHER PUBLICATIONS

International Search Report and Written Opinion—PCT/US2015/049834—ISA/EPO—Dec. 3, 2015.

(Continued)

*Primary Examiner* — John A Tweel, Jr.
(74) *Attorney, Agent, or Firm* — Weaver Austin Villeneuve & Sampson LLP

(57) ABSTRACT

Methods, devices and systems for determining whether an object is detected by a scanner are disclosed. Fast-Fourier-Transforms ("FFT") are determined, modified and evaluated. Each FFT may be determined with regard to a subset of gain-compensated pixel-values corresponding to pixel-values of an acquired image.

30 Claims, 8 Drawing Sheets

(56) References Cited

U.S. PATENT DOCUMENTS

2004/0170303 A1    9/2004   Cannon

OTHER PUBLICATIONS

Jin C., et al., "Liveness Detection of Fingerprint Based on Band-Selective Fourier Spectrum", Information Security and Cryptology—ICISC 2007, [Lecture Notes in Computer Science], Springer Berlin Heidelberg, Berlin, Heidelberg, vol. 4817, Nov. 29, 2007 (Nov. 29, 2007), pp. 168-179, XP019083103, ISBN: 978-3-540-76787-9, Section 2, figure 2.

* cited by examiner

S ≡ selected pixel

Input Fingerprint

FFT Magnitude Plot

MFFT

Air Image

FFT Magnitude Plot

MFFT

Air Image

FFT Magnitude Plot

MFFT

DETERMINING WHETHER A TARGET OBJECT WAS PRESENT DURING A SCANNING OPERATION

CROSS-REFERENCE TO RELATED APPLICATION

This application claims the benefit of priority to U.S. provisional patent application Ser. No. 62/050,025, filed on Sep. 12, 2014.

FIELD OF THE INVENTION

The present invention relates to devices, systems, and methods of determining whether an object has been presented for scanning.

BACKGROUND OF THE INVENTION

When using a scanning system, such as an ultrasonic scanner, it may be beneficial to determine quickly whether an object has been scanned by a scanning operation. If an object was not present during the scanning operation, then the information produced by the scanning operation should be discarded and/or ignored without further processing so as to preserve processor availability and conserve energy. However, if an object was present during the scanning operation, then information about that object obtained during the scanning operation may be processed, for example as part of an effort to authenticate an individual that presented the object. If authentication is made, then the individual may be permitted to engage in certain activities. Such activities may include, for example, the use of a smart phone or access to a restricted area within a building.

Methodologies for determining whether an object was present during a scanning operation have centered on determining a standard deviation for pixel information obtained from a scanning operation. Such methodologies have proved to be inaccurate, particularly when the scanner capability has degraded, which often occurs over time. Such inaccuracies may arise from the fact that a degraded sensor often produces complex patterns or noisy images, either of which can be mistaken for an object, when in fact no object has been presented for scanning.

SUMMARY

Described herein are methods for determining whether an object is detected by a scanner. One such method begins by providing a scanner, such as an ultrasonic scanner having an area-array that includes a plurality of scanning elements for detecting ultrasonic energy. The scanner is used to execute scanning operations in order to acquire at least one information set (the "acquired information set"). The acquired information set may be comprised of particular information values corresponding to pixels of the scanning area. For example, a particular pixel may correspond to one or more ultrasound transducers of the scanner. The acquired information set (e.g. the pixel values) may be processed to provide a processed information set. Processing of the acquired information set may include determining gain-compensated pixel-values. Each gain-compensated pixel-value may correspond to a pixel-value in the acquired information set.

Subsets of the processed information set may be identified, and a Fast-Fourier-Transform ("FFT") for each subset may be determined. Each subset may correspond to a different row or a different column of the scanning elements for detecting energy. Each FFT may be evaluated in order to provide at least one FFT-derived output for each subset. Then, a determination may be made for each of the FFT-derived outputs regarding whether that subset indicates that a target object was present during the scan. An indicator may be provided for each subset indicating whether the FFT-derived outputs indicate that a target object was present during the scanning operation. Indicators indicating that an object was not present during the scanning operation may be counted to obtain a count-value, and the count-value may be compared to a count-threshold. If the count-value exceeds the count-threshold, a message may be sent to indicate that a target object was not present during the scanning operation.

Evaluation of an FFT may include removal of a DC component to provide a modified FFT ("MFFT"). The MFFT may be used in additional evaluating efforts. For example, evaluation of an FFT may include identifying peaks of the MFFT. Identifying an MFFT peak may include identifying a maximum value of the peak and/or identifying a location of an MFFT peak.

Evaluation of an FFT may include counting peaks of the MFFT to provide a peak-count value. If the peak-count value exceeds a peak-number-threshold, then it may be assumed that the acquired information set was too noisy, and it may be assumed that a target object was not present during the scanning operation. In such a situation, the indicator may indicate that a target object was not present during the scanning operation.

Evaluation of an FFT may include determining whether an identified peak of the MFFT is at a predetermined location. If the MFFT has an identified peak at the predetermined location, and the peak-count value is in a predetermined range, then the indicator may indicate that a target object was not present during the scanning operation.

Evaluation of an FFT may include determining a peak ratio, which may be determined by (a) identifying a maximum value of a first peak, (b) identifying a maximum value of a second peak, and (c) dividing one of the maximum values by the other maximum value to produce the peak ratio. In addition, a standard deviation of the processed information set may be determined. Then, the peak ratio may be compared to a PR-threshold, and a determination may be made as to whether the peak ratio exceeds the PR-threshold, and the calculated standard deviation may be compared to a local SD-threshold, and a determination may be made as to whether the standard deviation exceeds the local SD-threshold. If the standard deviation does not exceed the local SD-threshold and the peak ratio exceeds the PR-threshold, then the indicator may indicate that a target object was not present during the scanning operation.

Also described herein are systems for determining whether an object is detected. One such system may include a means for scanning, such as a scanner (e.g. an area-array ultrasonic scanner) and a means for processing, such as a processor (e.g. as a microprocessor). The scanner may have scanning elements arranged in rows and columns, and each subset may correspond to a different row or a different column of the scanning elements.

The scanner and processor are in communication with each other. The processor is programmed to execute instructions for (a) executing scanning operations to acquire at least one information set ("acquired information set"), (b) processing the acquired information set to provide a processed information set, (c) identifying subsets of the processed information set, (d) determining a Fast-Fourier-Transform ("FFT") for each subset, (e) evaluating each FFT to provide at least one FFT-derived output for each subset, (f) determining whether the FFT-derived outputs for each subset indicate that a target object was present during the scan, and (g) for each subset, providing an indicator indicating whether the FFT-derived outputs indicate that a target object was present during the scanning operation.

The processor may be programmed to execute instructions for (i) counting the indicators indicating that a target object was not present during scanning to provide a count-value, (ii) comparing the count-value to a count-threshold, and (iii) if the count-value exceeds the count-threshold, sending a message indicating that a target object was not present during scanning. Such instructions may be fashioned to carry out one or more of the methods described herein.

Also described herein are non-transitory, computer-readable storage media having one or more computer programs of computer readable instructions for execution by one or more processors that are in communication with a biometric scanner to perform a method of generating an image. Such computer program(s) may include instructions for:

(a) processing the acquired information set to provide a processed information set;
(b) identifying subsets of the processed information set;
(c) determining a Fast-Fourier-Transform ("FFT") for each subset;
(d) evaluating each FFT to provide at least one FFT-derived output for each subset;
(e) determining whether the FFT-derived outputs for each subset indicate that a target object was present during the scan; and
(f) for each subset, providing an indicator indicating whether the FFT-derived outputs indicate that a target object was present during the scanning operation.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Described below are devices, systems and methods for determining whether an object was present or absent during a scanning operation. The scanning operation may be carried out by a scanner that obtains information about the object by detecting energy reflected from the object, or by detecting a change in energy caused by the presence of this object. Such systems may employ capacitive, radio-frequency, thermal, piezo-resistive, ultrasonic, or piezoelectric sensors as the means for detecting the presence of an object. Many such scanning devices exist for detecting ultrasound or light reflected from an object, such as a finger. One such ultrasonic system is Qualcomm Incorporated's 3D Fingerprint sensor, that is based on ultrasonic technology. A system for detecting a change in energy may be based on a capacitor arrangement, such as that utilized by model SmartFinger® 500 dpi capacitive fingerprint swipe sensors, provided by joint effort between Idex ASA, a Norwegian company specializing in fingerprint recognition (Idex), STMicroelectronics in France (ST) and SINTEF a Norwegian research institute (SINTEF). For ease of describing, we refer to a scanner that uses ultrasound to scan a finger for purposes of authenticating an individual, but the devices, systems and methods described herein are not limited to use with an ultrasound authentication system.

A scanning operation may be carried out using an array of ultrasonic sensors in order to acquire information (sometimes referred to herein as "image-information"). That image-information may describe an object, such as the friction ridge surface (e.g. fingerprint) of a finger that may reside on a platen of the scanner. It should be noted that the methodologies described herein are not limited to use with a scanner having a platen, and may be employed using a scanner that does not have a platen. However, since many scanners have a platen, embodiments of the invention are described herein with reference to a platen. The acquired image-information resulting from the scanning operation may be processed and analyzed to determine whether the acquired image-information has characteristics that indicate whether an object was provided during the scanning operation.

Figure 1:
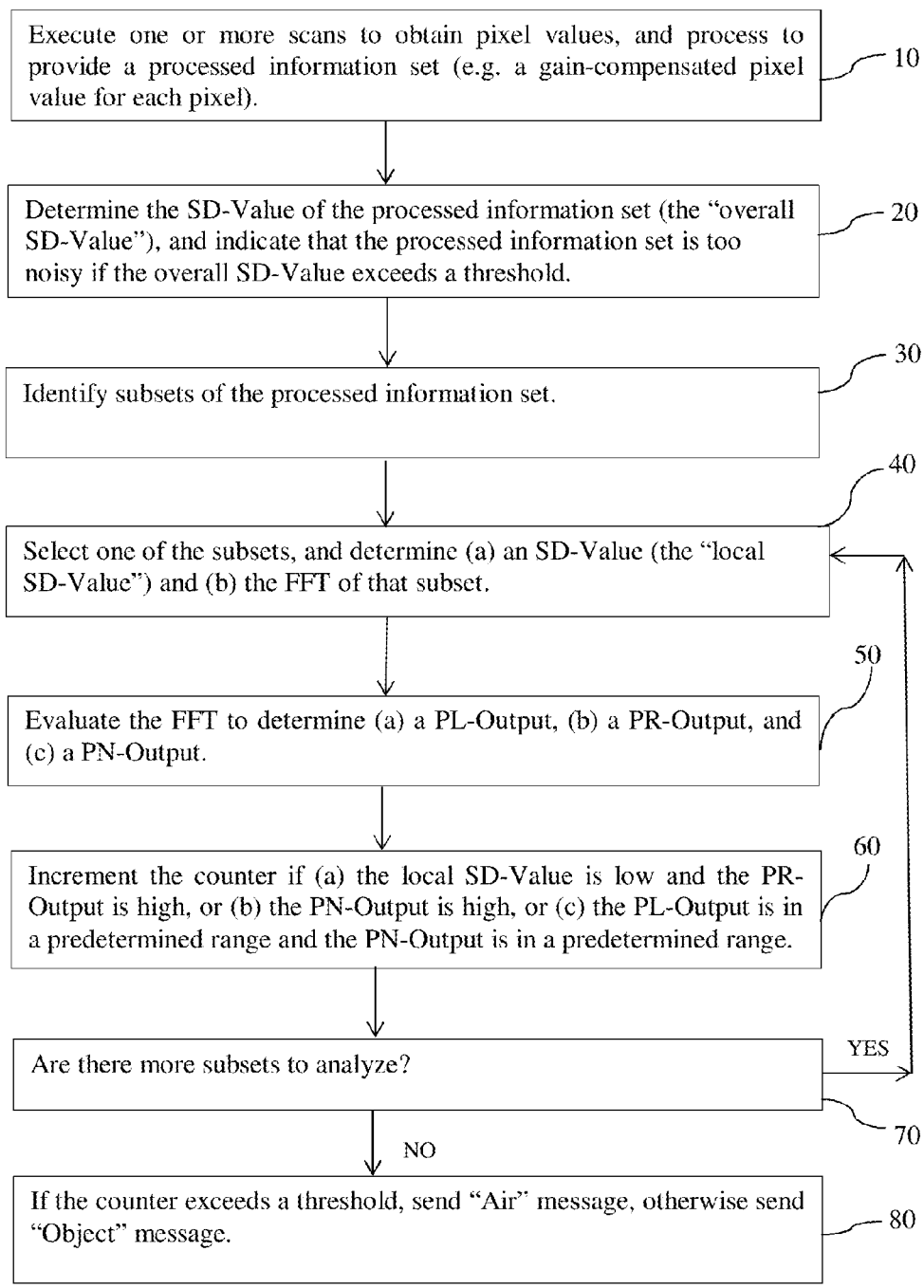
FIG. 1 is a flow diagram depicting a method of determining whether a target object was present during a scanning operation.

FIG. 1 is a flow diagram describing a method of determining whether an object (sometimes referred to herein as a "target object") was provided during a scanning operation. FIG. 1 notes that the scanner is caused to execute 10 a scan in order to obtain image-information, which is comprised of a plurality of pixel-values, describing an object that this in close proximity to an array of ultrasonic sensors. Each pixel-value may be indicative of the amount of ultrasonic energy reflected from the surface of the platen on which a target object would reside, if a target object were provided for scanning. The pixel-values may be numbers corresponding to a gray-scale. For example, areas where little or no ultrasound energy was reflected may have a pixel-value corresponding to the darker end of the gray-scale spectrum, while areas where much of the ultrasound energy was reflected may have a pixel-value corresponding to the lighter end of the gray-scale spectrum. Each pixel-value may be processed to provide a corresponding set of processed information. For example, each pixel-value may be processed to provide a gain-compensated pixel-value (sometimes referred to herein as "GCP-Value"). The processed information set (e.g. gain-compensated pixel-values) may be used to determine whether a target object was present during the scanning operation. It should be noted that the invention is described herein with reference to GCP-Values, but other types of processed information (e.g. those arising from the use of normalization transforms) may be used. For example, see M. Gruber and K. Y. Hsu, "Moment-Based Image Normalization with High Noise Tolerance," IEEE Transactions on Pattern Analysis and Machine Intelligence, vol. 19, pp. 136-139, 1997. Also, a linear normalization procedure for a gray scale input image is described in K. Jain, "Fundamentals of Digital Image Processing," Englewood Cliffs, N.J.: Prentice Hall, 1989, and R. C. Gonzalez, R. E. Woods, S. L. Eddins, "Digital Image Processing using Matlab, 2nd edition," Pearson-Prentice-Hall, 2009.

In one such method for determining whether a target object was present during a scanning operation, a count-value is set to a base value, such as zero, and the count-value is incremented 60 each time one or more criteria are met. For example, there may be three criteria, and if one of these criteria is met, then the count-value may be incremented 60. Once the gain-compensated pixel values are processed to determine whether the criteria have been met, the count-value may be compared 80 to a count-threshold, and if the count-value exceeds the count-threshold, then it may be determined that no target object was present during the scanning operation, and a message may be sent indicating the absence of a target object. Upon receipt of such a message, the image-information obtained by that scanning operation may be discarded.

However, if the count-value does not exceed the count-threshold, then it may be determined that a target object was present during the scanning operation, and a message may be sent indicating the presence of a target object. Upon receipt of such a message, the image-information obtained by that scanning operation may be saved and/or processed further. As noted above, if it is determined that a target object was present during the scanning operation, then the image-information may be processed as part of an effort to authenticate the individual that presented the target object. If authenticated, that individual may be permitted to engage in an activity, such as using a smart phone or entering a building.

The method depicted in FIG. 1 identifies three criteria. A first of the criteria is met if an SD-Value of gain-compensated pixel-values is below an SD-threshold value, and a PR-Output is above a PR-threshold value. A second of the criteria is met if a PN-Output is above a PN-threshold value. A third of the criteria is met if a PL-Output is in a predetermined PL-range, and the PN-Output is in a predetermined PN-range. Each of these criteria is explained in greater detail below.

GCP-Values: The criteria outlined in the preceding paragraph operate on gain-compensated pixel-values. There are many methods of obtaining gain-compensated pixel-values. For example, see M Tang, D C Liu, "Rationalized gain compensation for ultrasound imaging", 7th Asian-Pacific Conference on Medical and Biological Engineering, 282-285, Lee, Duhgoon; Kim, Yong Sun; Ra, Jong Beom, "Automatic time gain compensation and dynamic range control in ultrasound imaging systems", Medical Imaging 2006: Ultrasonic Imaging and Signal Processing. Edited by Emelianov, Stanislav; Walker, William F. Proceedings of the SPIE, Volume 6147, pp. 68-76 (2006), and Mackovski, A. (1983) Medical Imaging Systems. Prentice-Hall, Englewood Cliffs, N.J. That being the case, we summarize one manner of generating the GCP-Values, which involves acquiring five images. However, it should be noted that devices, systems, and methods of determining the presence of an object need not utilize this particular manner of obtaining gain-compensated pixel-values.

A particular manner of obtaining gain-compensated pixel-values may use an area-array ultrasonic scanner. The area-array ultrasonic scanner has a plurality of ultrasound detectors, each of which generates a pixel of information comprising the image-information. Each pixel of information may be indicative of the amount of energy received by a particular ultrasound detector. To generate gain-compensated pixel-values from the pixel-values comprising the image-information, five scanning operations may be made, each of which will produce a set of image-information. Those five sets of image-information may be acquired as follows:

Image #1: Place a target object ("TO") on the scanner, and collect image-information during a scanning operation with the tone burst of the scanner turned off. We refer to this first set of image-information as "$TO_{off}$".

Image #2: With the target object still on the scanner, collect image-information during a scanning operation with the tone burst of the scanner turned on. We refer to this second set of image-information as "$TO_{on}$".

Image #3: Collect image-information during a scanning operation with the tone burst of the scanner turned off when no target object ("NO") is presented to the scanner. We refer to this third set of image-information as "$NO_{off}$".

Image #4: Collect image-information during a scanning operation with the tone burst of the scanner turned on when no target object is presented to the scanner. We refer to this fourth set of image-information as "$NO_{on}$".

Image #5: Collect image-information during a scanning operation with the tone burst of the scanner turned off and the Dbias set at +0.1V when no target object is presented to the scanner. We refer to this fifth set of image-information as "NOdb".

Images #3, #4, and #5 may be obtained prior to an operation in which it is desired to know whether a target object is present. For example, Images #3, #4, and #5 may be obtained as part of a final step of the manufacturing process, or may be obtained as part of procedures for installing the scanner. Images #1 and #2 may be obtained as part of an effort to determine whether a target object is present, which itself may be part of an effort to authenticate an individual.

Using those five images, and processing on a pixel-by-pixel basis, the gain-compensated value for each pixel may be generated using the following equation:

$$GCP\text{-Value} = \frac{(TO_{on} - NO_{on}) - (TO_{off} - NO_{off})}{|NO_{on} - NO_{off}| + 0.3|NO_{db} - NO_{off}|}$$

Having provided information about gain-compensated pixel-values, we now provide information useful in understanding elements of the three criteria outlined above. Specifically, we provide descriptions of how an SD-Value and three FFT-derived outputs (PR-Output, PN-Output, and PL-Output) may be obtained.

SD-Values: The standard deviation of the GCP-Values (the "overall SD-Value") may be determined 20. The overall standard deviation may be provided, and used for purposes of determining whether the overall image is too noisy. For example, the overall SD-Value may be compared to a threshold value, and if the overall SD-Value exceeds that threshold, then the acquired information set may be deemed too noisy to process further.

In addition, an SD-Value may be determined for a selected subset (the "local SD-Value") of the processed information set (e.g. the GCP-Values) and later used for purposes of determining whether the count-value should be incremented. In particular, the local SD-Value may be used in conjunction with a PR-Output to determine whether to increment the count-value. Selection of a subset is discussed below in more detail.

FFT Derived Output: A PR-Output, PN-Output, and PL-Output may be derived for each of a subset of the data that comprise the GCP-Values. For example, a row (or column) of pixels may be selected, and the GCP-Values for that row (or column) of pixels may be identified 30 to comprise a subset from which a Fast-Fourier-Transform ("FFT") is derived. Computers may be programmed to receive values, such as a subset of the GCP-Values, and produce 40 an FFT corresponding to those values. A particular program that may be used for such purposes is FastCV Computer Vision SDK developed by Qualcomm Technologies Inc. (https://developer.qualcomm.com/docs/fastcv/api/index.html).

Figure 2:
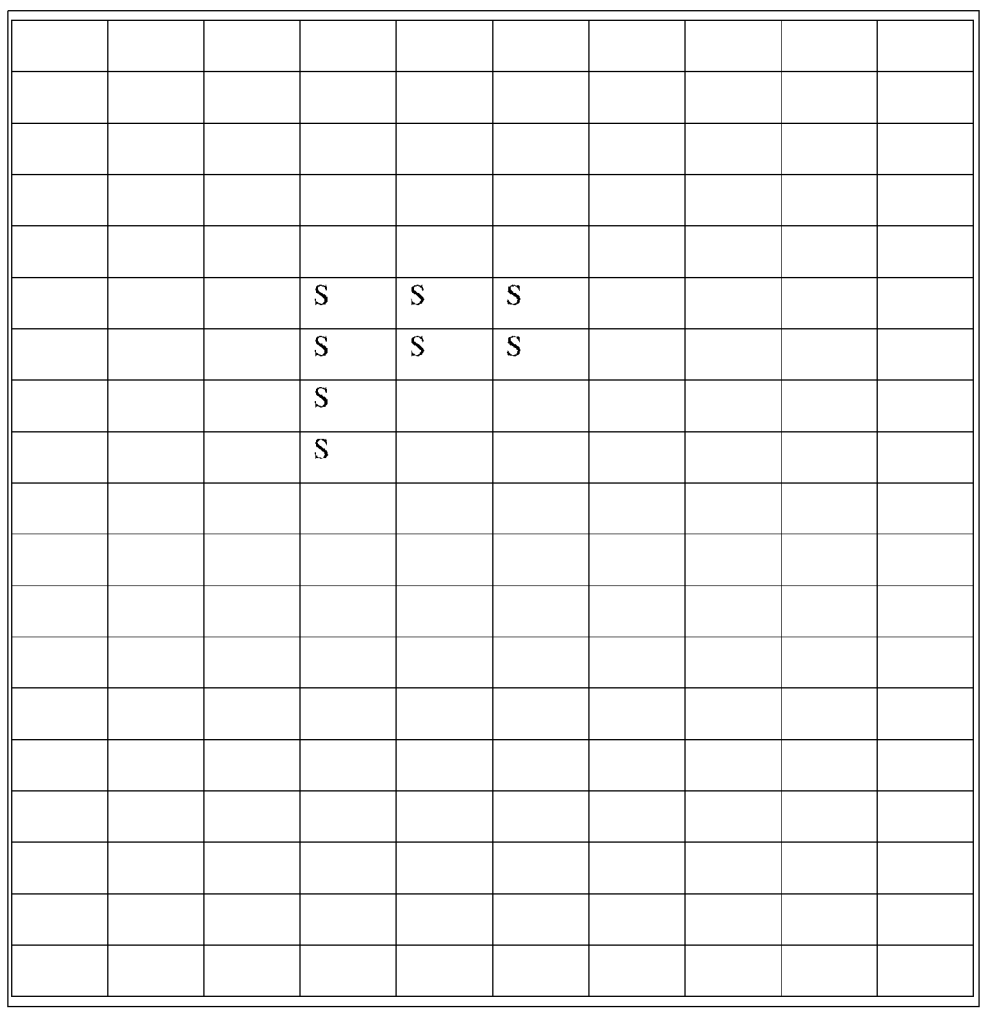
FIG. 2 shows 190 pixels, eight of which are identified as having been selected ("S")

More generally, the subset of the data that comprise the selected GCP-Values may be selected to include the GCP-Values corresponding to a group of pixels, which may be a column or row of pixels corresponding to a column or row of the scanner. However, the group of pixels need not correspond to a column or row of the scanner. For example, the group of pixels may be a block of pixels, for which each pixel in the block is immediately adjacent to at least one other pixel in the block, or immediately adjacent to at least two other pixels in the block. To illustrate, FIG. 2 shows 190 pixels from a scanning area, eight of which have been selected ("S") to comprise a group. It should be noted that the group of pixels need not be a straight line (e.g. row or column) or a block: other shapes (e.g. a zig-zag line) or a non-standard shape may be used to identify the group of pixels. In addition, the group of pixels need not be contiguous. For example, it may be the case that several non-contiguous groups of contiguous pixels may be selected, and the GCP-Values used to produce the FFT.

The group of pixels may be all of the scanning area, or a subset of the scanning area. In addition, the selected group of pixels may initially correspond to one group of pixels, and then, later a different group of pixels from the same set of acquired information set. For clarity, the methodologies may be applied multiple times using the same set of acquired information, each time analyzing a different portion of the acquired information. A subsequently selected group of pixels may be a subset of an initially selected pixel group, or may include some pixels that were, and some that were not, part of an initially selected pixel group. Or the subsequently selected group of pixels may be an entirely different group of pixels from those that were initially selected.

By applying the methodologies described herein multiple times using subsets of the information from one acquired information set, a search for an object (such as a fingerprint or stylus) may be carried out. As such, in a situation in which some portions of the scanning area have no object, it may nevertheless be possible to identify one portion that does have an object presented. With this information, it may be possible to determine which portions of the acquired information contain information about an object, and which do not. As such, it may be possible to determine the percentage of pixels that produced information about an object, or conversely the percentage of pixels which did not.

In addition, if a scanning area has a small portion in which an object is presented, it may be the case that analyzing the entire scanning area (or some large portion of the scanning area) will produce a conclusion that no object was presented simply because those pixels producing characteristics consistent with an object are not as numerous as those pixels producing characteristics consistent with no object being presented. By applying the methodologies to different portions of an acquired information set, it may be possible to find those pixels that are producing characteristics consistent with an object, and thereby correctly conclude that an object was presented. In addition, it may be possible to identify those pixel-areas of a scanner which produce a large amount of noise, and thereby exclude them from influencing an effort to determine whether an object is presented to a scanner, for example by excluding information produced by those pixels from being used to determine the SD-Values, PL-Output, PR-Output, and/or PN-Output. Or, it may be possible to identify those pixel-areas of a scanner which are producing a large amount of noise, and then establish criteria (e.g. predetermined peak location, PR-threshold, PN-threshold, PN-range) for that area that is different from other areas of the scanner.

Ideally, each subset of the GCP-Values is selected to be comprised primarily of GCP-Values derived from pixels which will detect a target object, if a target object is presented for scanning. If the scanning area is normally completely covered by a target object, most or all of the pixels may produce potential candidates for selection 40 as a subset from which an FFT is derived. This may be the case where the scanner is part of a cell phone, and the target object is a finger presented for purposes of authenticating the user as an authorized user of the cell phone. In such situations, the scanner is normally completely covered by the user's finger during an authentication process.

However, if the scanning area is larger than the expected size of the target object, there may be pixels that often do not detect a target object when a target object is presented, and those pixels may not produce ideal candidates for selection as a subset from which an FFT is derived. In those situations, it may be that some subsets, for example the columns or rows at the edges of the scanning area, will not likely produce ideal candidates for selection into a subset, but that other subsets (e.g. columns or rows that include pixels in the middle of the scanning area) are more likely to produce good candidates that will (when analyzed) indicate the presence of an object when an object is presented, and indicate the absence of an object when an object is not presented.

Once a subset of the GCP-Values is selected 40, the FFT for that subset may then be determined 40 and analyzed to determine 50 the PR-Output, PN-Output, and PL-Output (collectively, the "FFT-derived outputs") for that subset. As noted above, the FFT-derived outputs may be used to determine whether to increment 60 the count-value, which is used to determine whether a target object was present when Images #1 and #2 were obtained. This process may be repeated 70 if there are additional subsets to analyze.

Figure 3:
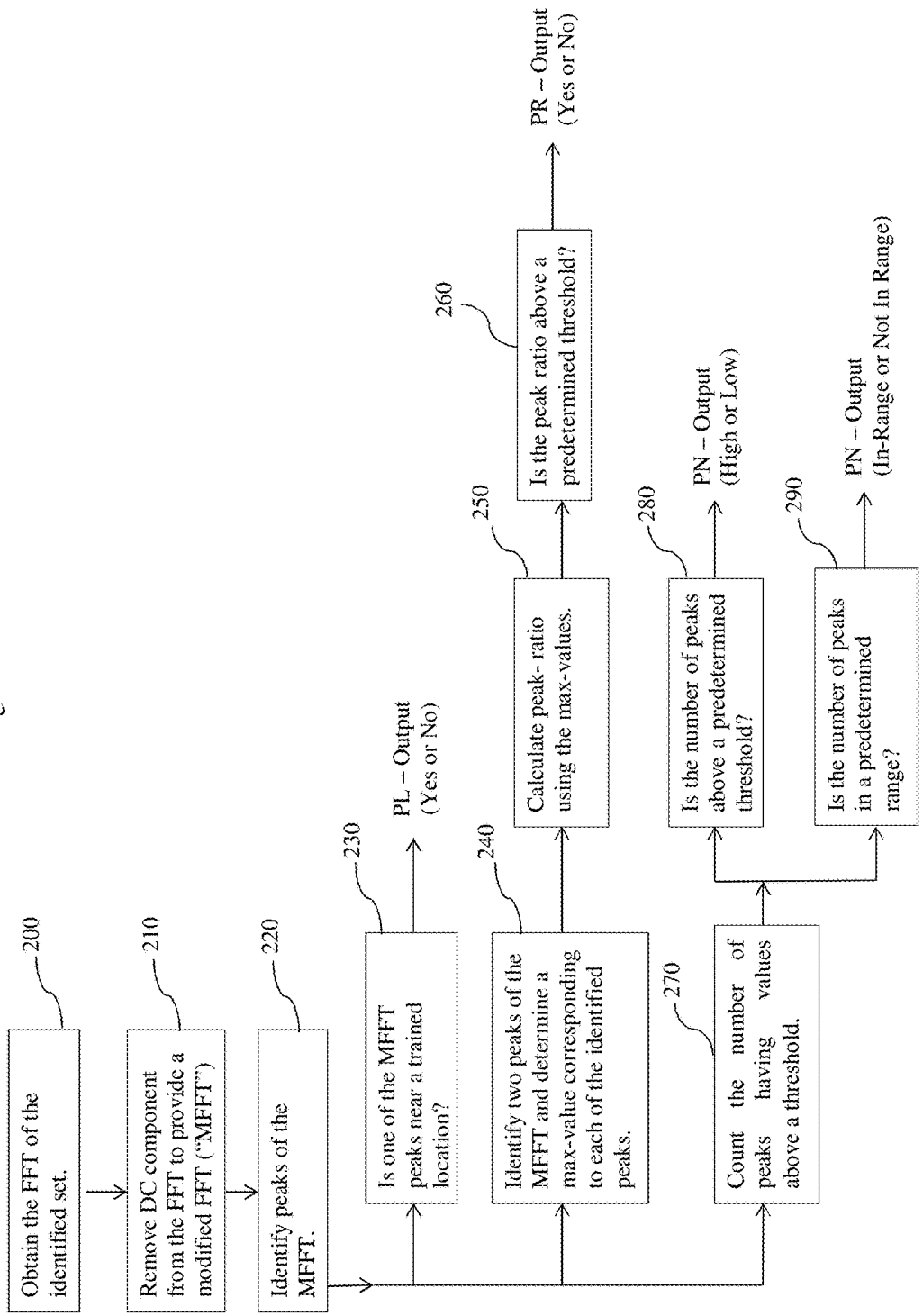
FIG. 3 is a flow diagram depicting a method of determining FFT-derived outputs.

FIG. 3 depicts steps of a method for obtaining the FFT-derived outputs for a particular subset. Once the FFT is obtained 200, a DC component of the FFT may be removed 210 in order to provide a modified FFT (the "MFFT"). Peaks of the MFFT may be identified 220 and used in three different operations, each of which produces one of the PR-Output, PN-Output, or PL-Output.

To produce the PL-Output, the location of peaks of the MFFT are determined and compared to a predetermined location. The predetermined location may be a location on a plot of the MFFT that is known (e.g. from prior experience) to have a peak when no target object is present for scanning. To afford some flexibility, the predetermined location may be defined as a range, and if the location of one of the peaks of the MFFT falls within that PL-range, a determination 230 may be made that the PL-Output should indicate the presence of a peak at the predetermined location. However, if none of the peaks of the MFFT falls within that PL-range, a determination 230 may be made that the PL-Output should indicate that no peak was present at the predetermined location.

To produce the PR-Output, two peaks of the MFFT may be selected 240, and a ratio of the corresponding peak values generated 250. For example, the maximum values of the two tallest peaks may be identified, and the peak-ratio may be determined by dividing the value of the tallest peak by the value of the next-tallest peak. That determined peak-ratio may be compared to a PR-threshold value, and if the ratio exceeds the PR-threshold value, then a determination 260 may be made that the PR-Output should indicate a high peak-ratio. However, if the peak-ratio does not exceed the PR-threshold value, then a determination 260 may be made that the PR-Output should indicate that there is not a high peak-ratio. The PR-threshold value used for determining whether a high peak-ratio exists for the MFFT may be obtained by peak detection techniques described in the following publications: S. J. Davey, S. B. Colegrove, and D. Mudge, 1999, "Advanced Jindalee Tracker: Enhanced Peak Detector", DSTO Australia, Technical Report No. DSTO-TR-0659, and also Jiapu Pan and Willis J. Tompkins, "A Real-Time QRS Detection Algorithm", IEEE Transactions on Biomedical Engineering, Vol. BME-32, No. 3, March 1985.

From the description above, it will now be recognized that the criteria are applied to each of the subsets. As such, each subset is producing an indication as to whether that subset indicates the presence or absence of a target object during a scanning operation. If a particular subset indicates that a target object was not present during a scanning operation, then the count-value is incremented. But, if a particular subset indicates that a target object was present during a scanning operation, then the count-value is not incremented. By setting the count-threshold, a system manager may establish the degree to which the system will indicate the presence or absence of a target object. For example, if the system manager desires a high degree of certainty that a target object is present, the system manager may set the count-threshold at a value which is low. Or, if the system manager desires a low degree of certainty that a target object is present, the system manager may set the count-threshold at a value which is high. Similarly, the local SD-threshold value, PR-threshold value, PN-threshold value, PL-range, and/or PN-range may be adjusted to obtain a desired degree of certainty.

To produce the PN-Output, peaks of the MFFT that exceed a predetermined PN-threshold value may be identified and counted 270. For example, the predetermined PN-threshold value may be set at a percentage (e.g. 8%) of the value corresponding to one of the peaks, for example the tallest or second-tallest peak, of the MFFT. So, for example, if the second-tallest peak of the MFFT has a value of 1300 and the set percentage is 9%, then peaks having a value above 117 would be counted, while peaks having a value at or below 117 would not be counted. If the number of peaks counted exceeds the PN-threshold value, then a determination 280 may be made that the PN-Output should indicate the presence of a high number of peaks. If the counted number of peaks does not exceed the PN-threshold value, a determination 280 may be made that the PN-Output should indicate that there is not a high number of peaks in the MFFT. Techniques for determining the PN-threshold value used for determining 280 whether a high number of peaks in an MFFT exists are described in the following article: Jiapu Pan and Willis J. Tompkins, "A Real-Time QRS Detection Algorithm", IEEE Transactions on Biomedical Engineering, Vol. BME-32, No. 3, March 1985.

In addition, if the number of peaks counted is in a predetermined range, then a determination 290 may be made that the PN-Output should indicate that the number of counted peaks is within the predetermined PN-range. However, if the number of counted peaks of the MFFT is not in the predetermined PN-range, a determination 290 may be made that the PN-Output should indicate that the number of counted peaks is not within the predetermined range.

Case Studies: The following three case studies illustrate aspects of the methodology described above.

Figure 4A:
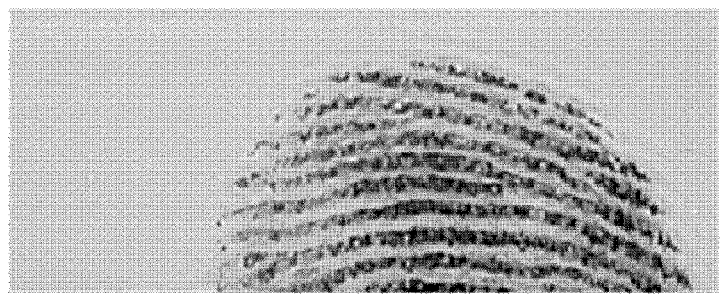
FIG. 4A is a graphical depiction of image-information obtained in a first case study by an ultrasonic scanner during a scanning operation in which a target object was present on a platen.
Figure 4B:
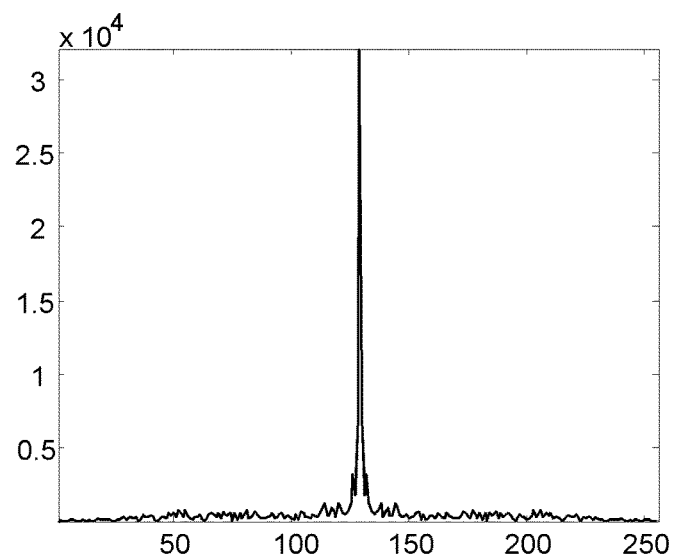
FIG. 4B is an FFT magnitude plot corresponding to GCP-Values of the first case study.
Figure 4C:
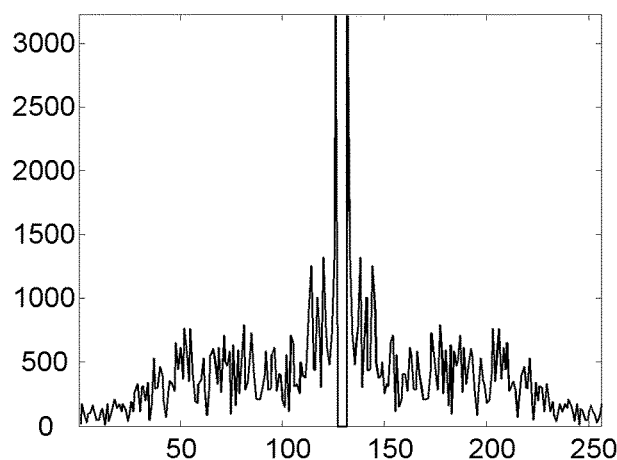
FIG. 4C is a magnitude plot of an MFFT of the first case study.

FIGS. 4A, 4B, and 4C correspond to a first of the case studies. FIG. 4A graphically illustrates image-information obtained by an ultrasonic scanner during a scanning operation in which a target object was present on a platen. The image-information is provided in FIG. 4A using a gray-scale. Ridges of the fingerprint appear as dark areas, and valleys of the fingerprint appear as light areas.

FIG. 4B is an FFT magnitude plot corresponding to GCP-Values of the first case study. The large peak in the middle of the FFT plot corresponds to the DC component. By removing the DC component and adjusting the values identified on the axes of the plot, FIG. 4C results, which is a magnitude plot of an MFFT of the first case study. It should be noted that the MFFT plot of FIG. 4C shows a large number of peaks, which is in keeping with the presence of a target object, and the counted number of peaks did not exceed a PN-threshold. This particular case study did not produce tall peaks in predetermined locations corresponding to an absence of a target object. In addition, this first case study produced a local standard deviation exceeding a local SD-threshold. As such, the methodology described above produced an indication that a target object was presented during the scanning operation.

Figure 5A:
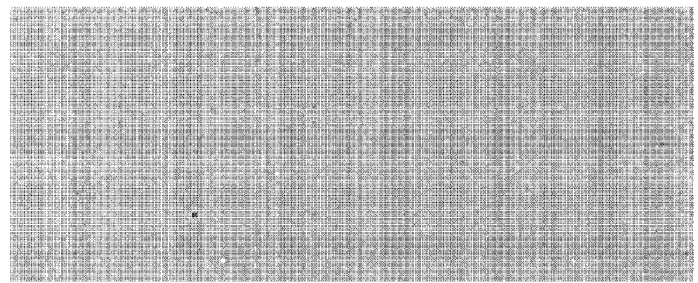
FIG. 5A is a graphical depiction of image-information obtained in a second case study by an ultrasonic scanner during a scanning operation in which a target object was not present on a platen.
Figure 5B:
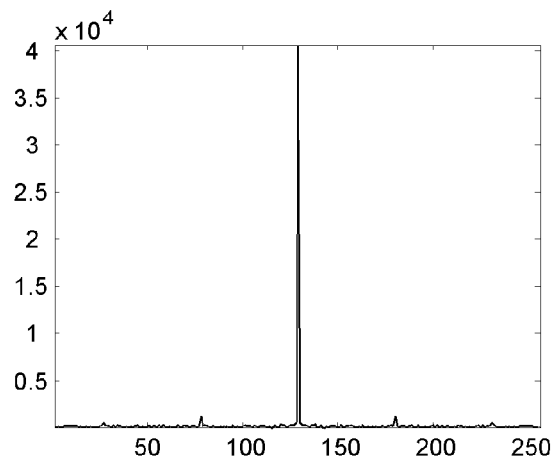
FIG. 5B is an FFT magnitude plot corresponding to GCP-Values of the second case study.
Figure 5C:
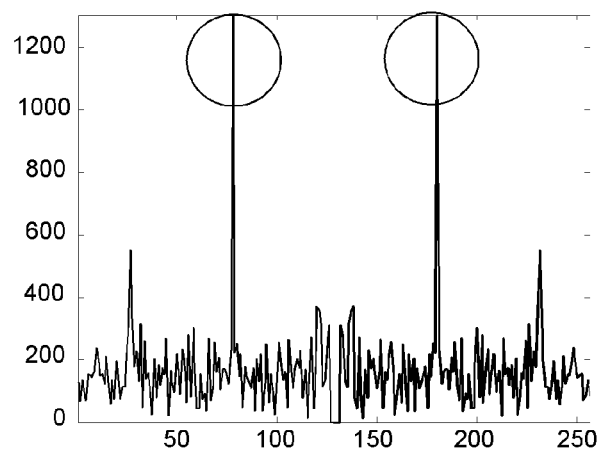
FIG. 5C is a magnitude plot of an MFFT of the second case study.

FIGS. 5A, 5B, and 5C correspond to a second of the case studies. FIG. 5A graphically illustrates image-information obtained by the ultrasonic scanner during a scanning operation in which a target object was not present on a platen. The image-information is provided in FIG. 5A using a gray-scale. Unlike FIG. 4A, the image of FIG. 5A is relatively uniform, and therefore indicates the absence of a target object.

FIG. 5B is an FFT magnitude plot corresponding to GCP-Values of the second case study. The large peak in the middle of the FFT plot corresponds to the DC component. By removing the DC component and adjusting the values identified on the axes of the plot, FIG. 5C results, which is a magnitude plot of an MFFT of the second case study. It should be noted that the MFFT plot of FIG. 5C shows a large number of peaks, but most are not very tall, which is in keeping with the absence of a target object. In this second case study, the counted number of peaks did not exceed a PN-threshold. Also, FIG. 5C shows tall peaks of the MFFT in each of two predetermined locations, which are identified by circles. This second case study produced an indication that a target object was not present during the scanning operation.

Figure 6A:
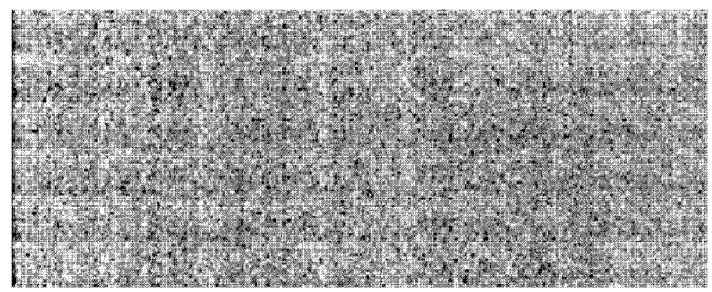
FIG. 6A is a graphical depiction of image-information obtained in a third case study by an ultrasonic scanner during a scanning operation in which a target object was not present on a platen.
Figure 6B:
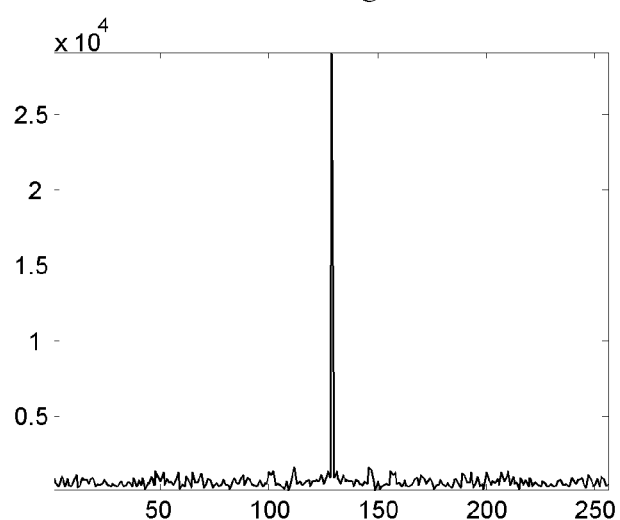
FIG. 6B is an FFT magnitude plot corresponding to GCP-Values of the third case study.
Figure 6C:
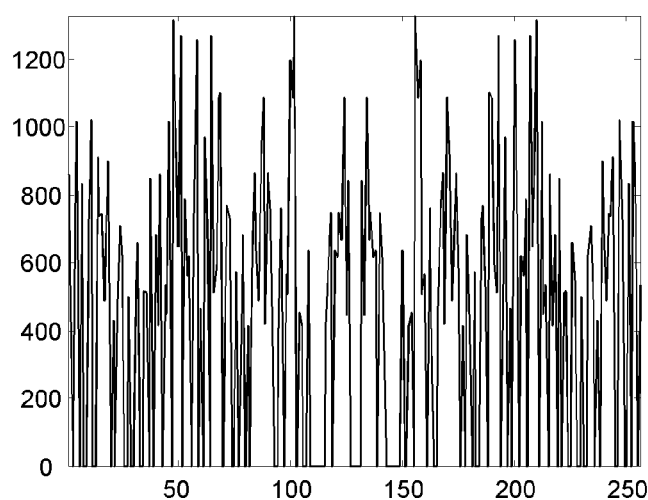
FIG. 6C is a magnitude plot of an MFFT of the third case study.
Figure 7:
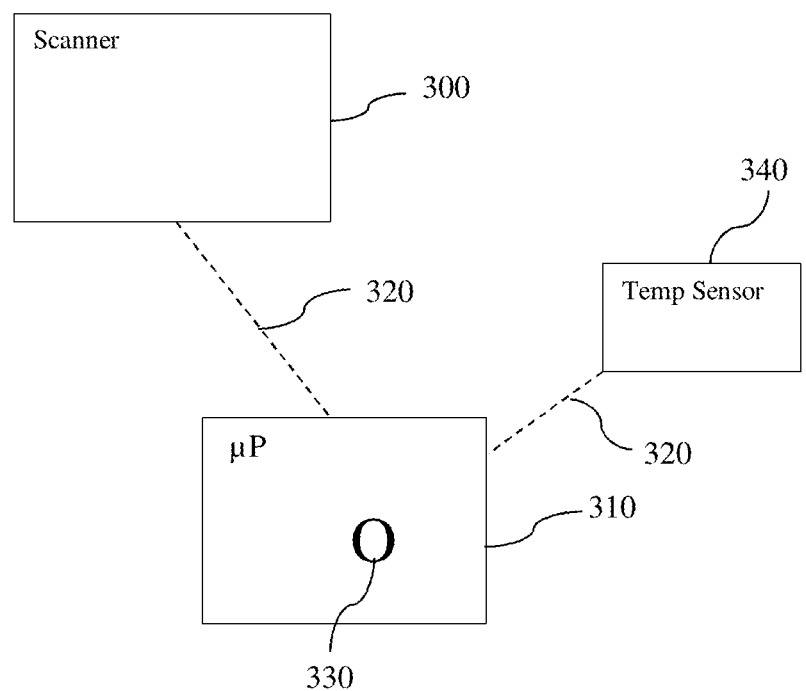
FIG. 7 schematically depicts a system for determining whether an object was present during a scanning operation.

FIGS. 6A, 6B, and 6C correspond to a third of the case studies. FIG. 6A graphically illustrates image-information obtained by the ultrasonic scanner during a scanning operation in which a target object was not present on a platen. Unlike the second case study, the third case study produced a very noisy image. See FIG. 6A and FIG. 6C. To improve the ability to distinguish between images that are merely noisy, and images having noise but which may include an object, the criteria used to identify the presence of an object may be adjusted based on the temperature of the scanner 300. See FIG. 7. In such an embodiment, a temperature sensor 340 may be included, and used by the microprocessor 310 to select (a) values for (a) the predetermined location used to decide the PL-Output, and/or (b) the PR-threshold, and/or (c) the PN-threshold and/or (d) the PN-range that are previously determined to be best for that particular temperature.

FIG. 6B is an FFT magnitude plot corresponding to GCP-Values of the third case study. The large peak in the middle of the FFT plot corresponds to the DC component. By removing the DC component and adjusting the values identified on the axes of the plot, FIG. 6C results, which is a magnitude plot of an MFFT of the third case study. It should be noted that, unlike FIG. 5C, the MFFT shown in FIG. 6C shows a large number of very tall peaks. In this third case study, the counted number of peaks exceed a PN-threshold, and so the PN-Output indicated a high number of peaks. The resulting indication for case study three was that a target object was not present during the scanning operation.

Having described methods for determining whether an object is detected by a scanning operation, it should be apparent that a system for performing those methods may include a scanner 300 and a processor 310. See FIG. 7. The processor 310 may be in communication with the scanner 300 via a communication channel 320, and programmed to execute instructions. The instructions may be stored on a non-transitory, computer-readable storage medium 330, such as a CD, USB-flash drive, or read-only-memory device. A temperature sensor 340 may be used to determine the temperature of the scanner 300, and provide temperature information to the microprocessor 310. The temperature information may be used by the microprocessor to adjust criteria used to determine whether an object is presented to the scanner 300.

The scanner 300 may have an area-array of scanning elements, at least some of which detect energy, such as ultrasound energy. The area-array may be arranged so that the scanning elements are arranged in rows and columns.

The processor 310 may be programmed to execute instructions for:
  executing scanning operations to acquire at least one information set ("acquired information set");
  processing the acquired information set to provide a processed information se, which may include gain-compensated pixel values;
  identifying subsets of the processed information set;
  determining a Fast-Fourier-Transform ("FFT") for each subset;
  evaluating each FFT to provide at least one FFT-derived output for each subset;
  determining whether the FFT-derived outputs for each subset indicate that a target object was present during the scan;
  for each subset, providing an indicator indicating whether the FFT-derived outputs indicate that a target object was present during the scanning operation.

The processor 310 may be programmed to execute instructions for:
  counting the indicators indicating that a target object was not present during scanning to provide a count-value;
  comparing the count-value to a count-threshold; and
  if the count-value exceeds the count-threshold, sending a message indicating that a target object was not present during scanning.

The instructions for evaluating each FFT may include instructions for:
  (a) removing a DC component of the FFT in order to provide a modified FFT ("MFFT"),
  (b) identifying peaks of the MFFT,
  (c) counting peaks of the MFFT to provide a peak-count value;
  (d) determining whether an identified peak of the MFFT is at a predetermined location;
  (e) determining a peak ratio, the peak ratio is determined by:
    identifying a maximum value of a first peak;
    identifying a maximum value of a second peak;
    dividing one of the maximum values by the other maximum value to produce the peak ratio.

Figure 8A:
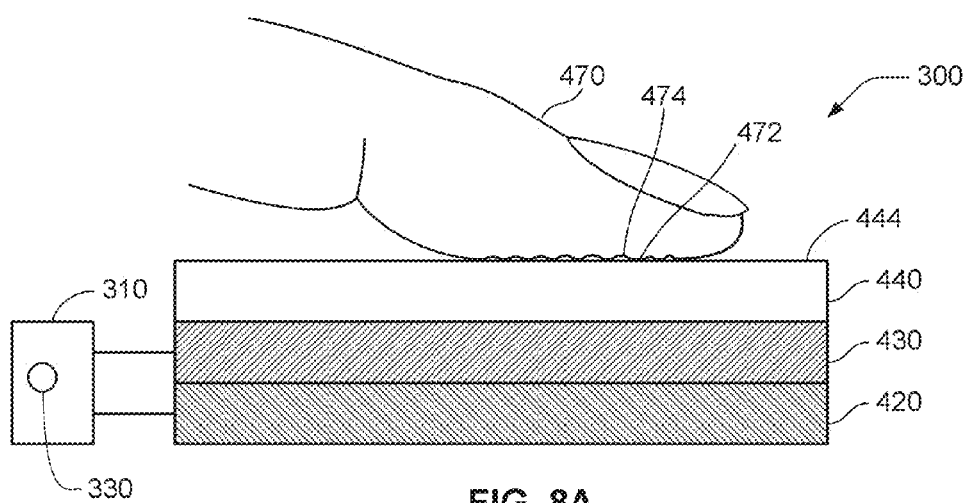
FIGS. 8A, 8B and 8C are schematics of a system at various stages of a scanning operation involving a finger.
Figure 8B:
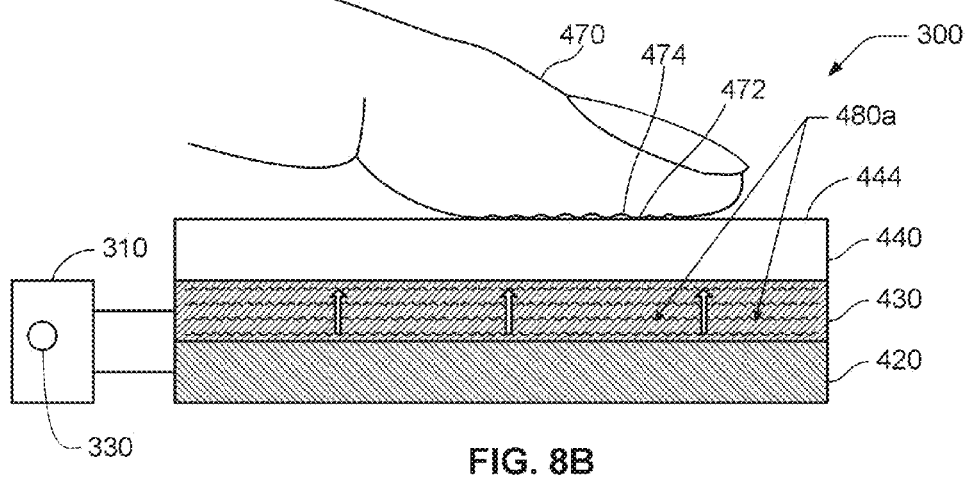
Figure 8C:
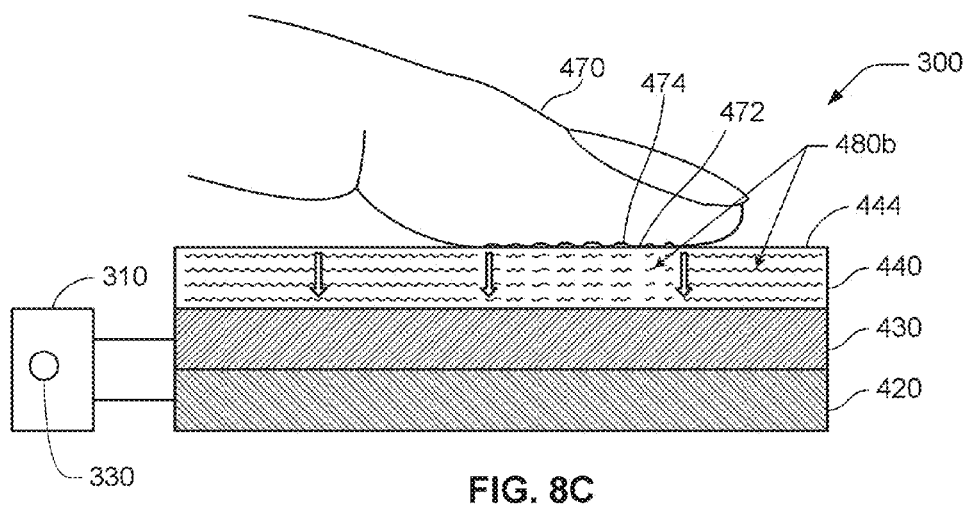

FIGS. 8A, 8B and 8C depict a scanner 300 at various stages of a scanning operation. The processor 310 may be in communication with an energy transmitter 420, such as an ultrasound generator, and an energy receiver 430, such as an ultrasound receiver. The processor 310 may be programmed to cause the scanner 300 to scan the object 470 residing on a platen 440, and to receive information from the receiver 430 about reflected energy detected by the receiver 430. Programming of the processor 310 may be via a non-transitory, computer-readable storage medium 330, such as a CD, USB-flash drive, or read-only-memory device. A scan may include causing the transmitter 420 to produce a plane-wave 480a traveling toward the object 470, such as a finger, that resides on an exposed surface 444 of the platen 440. An outer surface of the object 470 may have the ridges 472 and valleys 474, such as those commonly found on the friction ridge of a finger.

The emitted plane-wave 480a travels to the object 470, where some of the wave energy is reflected. The reflected energy 480b then travels to the receiver 430 where the reflected energy 480b is detected by the receiver 430. The processor 310 may be programmed to analyze reflected energy 480b that has been detected by the receiver 430, and then provide an analysis result. Analysis of the reflected energy 480b may be according to methods described above. The analysis result may be an "object" flag (if an objected is determined to be present) or an "air" flag (if no object is determined to be present).

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method for determining whether an object is detected by a scanner, comprising:
   providing a scanner;
   executing scanning operations using the scanner to acquire at least one information set ("acquired information set");
   processing the acquired information set to provide a processed information set;
   identifying subsets of the processed information set;
   determining a Fast-Fourier-Transform ("FFT") for each subset;
   evaluating each FFT to provide at least one FFT-derived output for each subset;
   determining whether the FFT-derived outputs for each subset indicate that a target object was present during the scan; and
   for each subset, providing an indicator indicating whether the FFT-derived outputs indicate that a target object was present during the scanning operation.

2. The method of claim 1, further comprising:
   counting the indicators indicating that a target object was not present during scanning to provide a count-value;
   comparing the count-value to a count-threshold; and
   if the count-value exceeds the count-threshold, sending a message indicating that a target object was not present during scanning.

3. The method of claim 1, wherein the scanner is an area-array ultrasonic scanner.

4. The method of claim 1, wherein evaluating each FFT includes removal of a DC component to provide a modified FFT ("MFFT").

5. The method of claim 4, wherein evaluating each FFT includes identifying peaks of the MFFT.

6. The method of claim 5, wherein evaluating each FFT includes counting peaks of the MFFT to provide a peak-count value.

7. The method of claim 6, wherein if the peak-count value exceeds a peak-number-threshold, then the indicator indicates that a target object was not present during the scanning operation.

8. The method of claim 6, wherein evaluating each FFT includes determining whether an identified peak of the MFFT is at a predetermined location.

9. The method of claim 8, wherein if the MFFT has an identified peak at the predetermined location, and the peak-count value is in a predetermined range, then the indicator indicates that a target object was not present during the scanning operation.

10. The method of claim 5, wherein evaluating each FFT includes determining a peak ratio, the peak ratio is determined by:
    identifying a maximum value of a first peak;
    identifying a maximum value of a second peak;
    dividing one of the maximum values by the other maximum value to produce the peak ratio.

11. The method of claim 10, further comprising calculating a standard deviation of the processed information set.

12. The method of claim 11, further comprising:
    comparing the peak ratio to a PR-threshold;
    determining whether the peak ratio exceeds the PR-threshold;
    comparing the calculated standard deviation to a local SD-threshold;
    determining whether the standard deviation exceeds the local SD-threshold;
    if the standard deviation does not exceed the local SD-threshold and the peak ratio exceeds the PR-threshold, then the indicator indicates that a target object was not present during the scanning operation.

13. A system for determining whether an object is detected, comprising:
    a scanner;
    a processor in communication with the scanner, the processor being programmed to execute instructions for:
       executing scanning operations to acquire at least one information set ("acquired information set");
       processing the acquired information set to provide a processed information set;
       identifying subsets of the processed information set;
       determining a Fast-Fourier-Transform ("FFT") for each subset;
       evaluating each FFT to provide at least one FFT-derived output for each subset;
       determining whether the FFT-derived outputs for each subset indicate that a target object was present during the scan; and
       for each subset, providing an indicator indicating whether the FFT-derived outputs indicate that a target object was present during the scanning operation.

14. The system of claim 13, wherein the scanner is an area-array ultrasonic scanner, and the area-array has scanning elements arranged in rows and columns, and each subset corresponds to a different row or a different column of the scanning elements.

15. The system of claim 13, wherein processing the acquired information set includes determining gain-compensated pixel-values.

16. The system of claim 13, wherein evaluating each FFT includes removal of a DC component to provide a modified FFT ("MFFT").

17. The system of claim 16, wherein evaluating each FFT includes identifying peaks of the MFFT.

18. The system of claim 17, wherein evaluating each FFT includes counting peaks of the MFFT to provide a peak-count value.

19. The system of claim 18, wherein if the peak-count value exceeds a peak-number-threshold, then the indicator indicates that a target object was not present during the scanning operation.

20. The system of claim 18, wherein evaluating each FFT includes determining whether an identified peak of the MFFT is at a predetermined location.

21. The system of claim 20, wherein if the MFFT has an identified peak at the predetermined location, and the peak-count value is in a predetermined range, then the indicator indicates that a target object was not present during the scanning operation.

22. The system of claim 18, wherein evaluating each FFT includes determining a peak ratio, the peak ratio is determined by:
    identifying a maximum value of a first peak;
    identifying a maximum value of a second peak;
    dividing one of the maximum values by the other maximum value to produce the peak ratio.

23. The system of claim 22, further comprising calculating a standard deviation of the processed information set.

24. The system of claim 23, further comprising:
    comparing the peak ratio to a PR-threshold;
    determining whether the peak ratio exceeds the PR-threshold;

comparing the calculated standard deviation to a local SD-threshold;

determining whether the standard deviation exceeds the local SD-threshold;

if the standard deviation does not exceed the local SD-threshold and the peak ratio exceeds the PR-threshold, then the indicator indicates that a target object was not present during the scanning operation.

25. A non-transitory, computer-readable storage medium comprising one or more computer programs of computer readable instructions for execution by one or more processors in communication with a biometric scanner to perform a method of generating an image, the computer program(s) comprising instructions for:

processing the acquired information set to provide a processed information set;

identifying subsets of the processed information set;

determining a Fast-Fourier-Transform ("FFT") for each subset;

evaluating each FFT to provide at least one FFT-derived output for each subset;

determining whether the FFT-derived outputs for each subset indicate that a target object was present during the scan; and for each subset, providing an indicator indicating whether the FFT-derived outputs indicate that a target object was present during the scanning operation.

26. The storage medium of claim 25, wherein evaluating each FFT includes removal of a DC component to provide a modified FFT ("MFFT").

27. The storage medium of claim 26, wherein evaluating each FFT includes identifying peaks of the MFFT.

28. A system for determining whether an object is detected, comprising:

a means for scanning; and a means for processing in communication with the means for scanning, the means for processing being programmed to execute instructions for:

executing scanning operations to acquire at least one information set ("acquired information set");

processing the acquired information set to provide a processed information set;

identifying subsets of the processed information set;

determining a Fast-Fourier-Transform ("FFT") for each subset;

evaluating each FFT to provide at least one FFT-derived output for each subset;

determining whether the FFT-derived outputs for each subset indicate that a target object was present during the scan; and for each subset, providing an indicator indicating whether the FFT-derived outputs indicate that a target object was present during the scanning operation.

29. The system of claim 28, wherein evaluating each FFT includes removal of a DC component to provide a modified FFT ("MFFT").

30. The system of claim 29, wherein evaluating each FFT includes identifying peaks of the MFFT.

* * * * *